(12) United States Patent
French et al.

(10) Patent No.: US 9,651,348 B2
(45) Date of Patent: May 16, 2017

(54) CARPENTER'S TAPE MEASURE HAVING FUNCTION INDICIA

(71) Applicant: FWD Tools, LLC, Annandale, VA (US)

(72) Inventors: Willis M. French, Annandale, VA (US); Don Gregory French, Green Valley, AZ (US)

(73) Assignee: FWD Tools, LLC, Annandale, VA (US)

( * ) Notice: Subject to any disclaimer, the term of this patent is extended or adjusted under 35 U.S.C. 154(b) by 275 days.

(21) Appl. No.: 14/133,181

(22) Filed: Dec. 18, 2013

(65) Prior Publication Data
US 2015/0168119 A1    Jun. 18, 2015

(51) Int. Cl.
*G01B 3/10*     (2006.01)
*E04B 1/00*     (2006.01)

(52) U.S. Cl.
CPC .............. *G01B 3/1082* (2013.01); *E04B 1/00* (2013.01); *G01B 3/10* (2013.01); *G01B 2003/1094* (2013.01)

(58) Field of Classification Search
CPC   G01B 3/10; G01B 3/1082; G01B 2003/1094; E04B 1/00
USPC .............. 33/483, 494, 755, 759, 194, 679.1; 52/105; 235/87 R, 88 R, 88 RC, 61 GM, 235/61 B
See application file for complete search history.

(56) References Cited

U.S. PATENT DOCUMENTS

| | | | | |
|---|---|---|---|---|
| 731,175 | A * | 6/1903 | Goodman | G09B 19/02 235/87 R |
| 1,463,605 | A * | 7/1923 | Walters | G01B 3/56 33/476 |
| 1,579,137 | A * | 3/1926 | Pecker | B43L 7/0275 33/476 |
| 1,666,996 | A * | 4/1928 | Hazen | A63F 1/02 273/299 |
| 1,851,744 | A * | 3/1932 | Wellington | G06G 1/14 235/61 GM |
| 2,092,268 | A * | 9/1937 | Quijano | B43K 29/093 235/61 B |
| 2,187,087 | A * | 1/1940 | Leary | E04G 21/1891 29/407.09 |
| 2,350,374 | A * | 6/1944 | Speert | G09B 27/04 235/61 S |
| 3,270,421 | A * | 9/1966 | Jones | G06G 1/0021 33/759 |
| 4,499,666 | A * | 2/1985 | Smith | B25H 7/02 33/194 |
| 4,575,943 | A * | 3/1986 | Baum, Jr. | G01B 5/245 33/453 |
| 5,012,590 | A * | 5/1991 | Wagner | B25H 7/00 33/494 |

(Continued)

*Primary Examiner* — R. A. Smith
*Assistant Examiner* — Tania Courson
(74) *Attorney, Agent, or Firm* — Womble Carlyle

(57) ABSTRACT

A carpenter's tape has a housing into which a tape web may be retracted. Function indicia are provided on the tape web. The tape has a squaring function legend on either or both of the housing and the tape web. Squaring function indicia are found on one or both sides of the tape web. Length measurement indicia, header indicia and pre-cut stud indicia are provided on one side of the tape web. The opposite side of the tape web may have one or more of rough opening indicia and wall tee layout indicia.

27 Claims, 15 Drawing Sheets

(56) References Cited

U.S. PATENT DOCUMENTS

| | | | | |
|---|---|---|---|---|
| 5,230,158 | A * | 7/1993 | Wall | G01B 3/004 33/494 |
| 5,367,783 | A * | 11/1994 | Nygren | E04G 21/1891 33/478 |
| 5,519,943 | A * | 5/1996 | Snyder | G01B 3/02 33/476 |
| 5,627,763 | A * | 5/1997 | Carlson | B25H 7/00 33/494 |
| 5,632,095 | A * | 5/1997 | Day | G01B 3/04 33/483 |
| 5,884,408 | A * | 3/1999 | Simmons | G01B 3/02 33/494 |
| 5,913,586 | A * | 6/1999 | Marshall | G01B 3/004 33/494 |
| 6,237,243 | B1 * | 5/2001 | Cook | G01B 3/1082 33/758 |
| D446,462 | S * | 8/2001 | Van Der Klok | D10/71 |
| 6,360,448 | B1 * | 3/2002 | Smyj | E04F 21/0007 33/434 |
| 6,470,582 | B1 * | 10/2002 | Renko | G01C 15/00 33/1 G |
| 6,494,014 | B2 * | 12/2002 | Lafrance | G01B 3/02 33/494 |
| 6,920,700 | B2 * | 7/2005 | Ekdahl | B25H 7/005 33/494 |
| 6,978,553 | B2 * | 12/2005 | Doublet | G01C 15/12 33/1 G |
| 7,059,061 | B2 | 6/2006 | French | |
| D528,446 | S * | 9/2006 | Camuso | D10/71 |
| 7,644,510 | B2 * | 1/2010 | Gingerella | G01B 3/10 33/679.1 |
| 7,793,421 | B2 * | 9/2010 | Hardy | G01B 3/08 33/194 |
| 7,958,645 | B1 * | 6/2011 | Chappell | 33/474 |
| 8,225,521 | B1 * | 7/2012 | Mooney | E04G 21/1891 33/194 |
| 9,230,016 | B2 * | 1/2016 | Neill | G06F 17/276 |
| 2002/0038518 | A1 * | 4/2002 | Barrows | E04G 21/1891 33/758 |
| 2003/0126752 | A1 * | 7/2003 | Brandon | G01B 3/1082 33/494 |
| 2004/0055174 | A1 * | 3/2004 | Hirsch, Jr. | G01B 3/1082 33/759 |

* cited by examiner

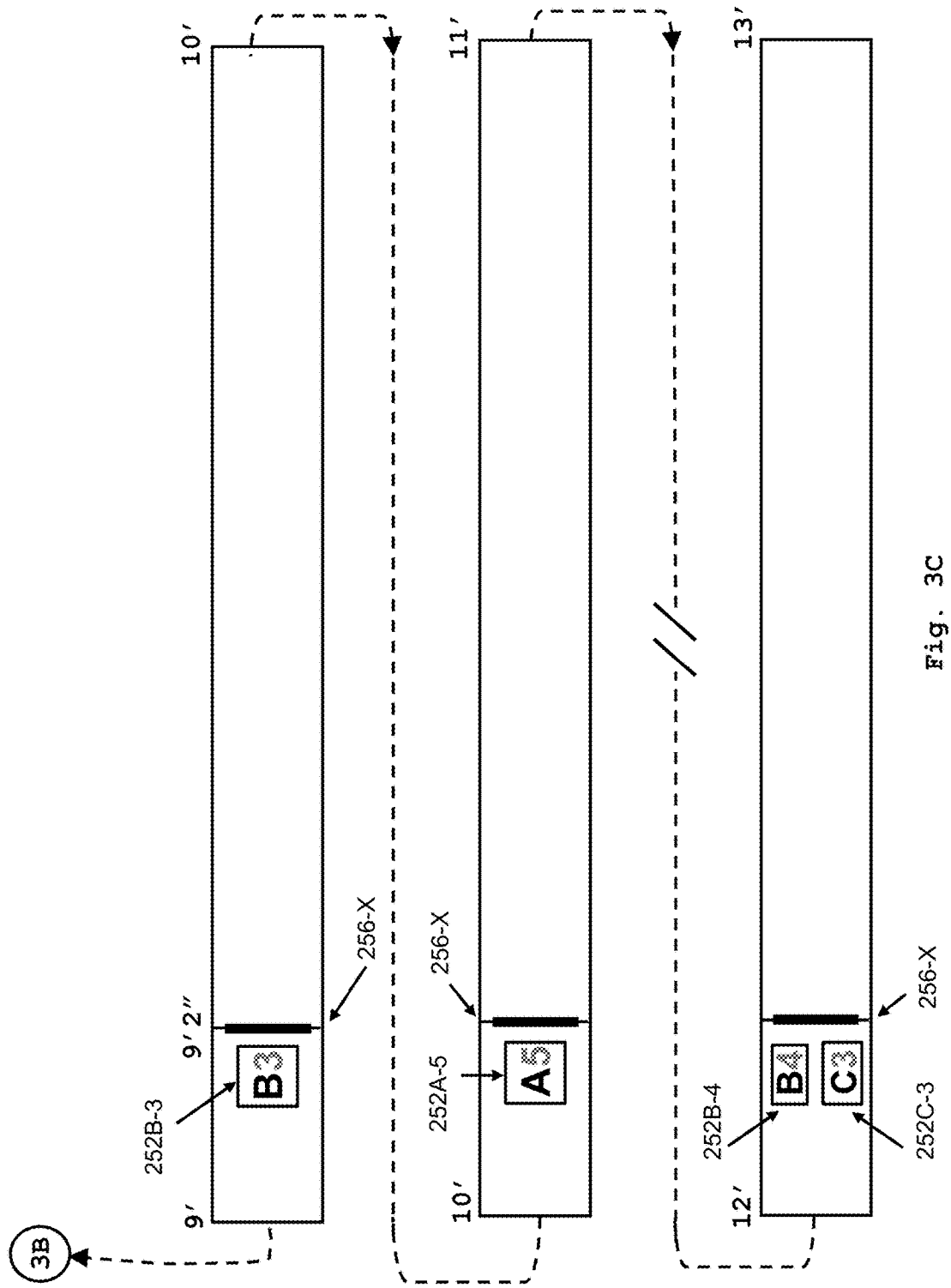

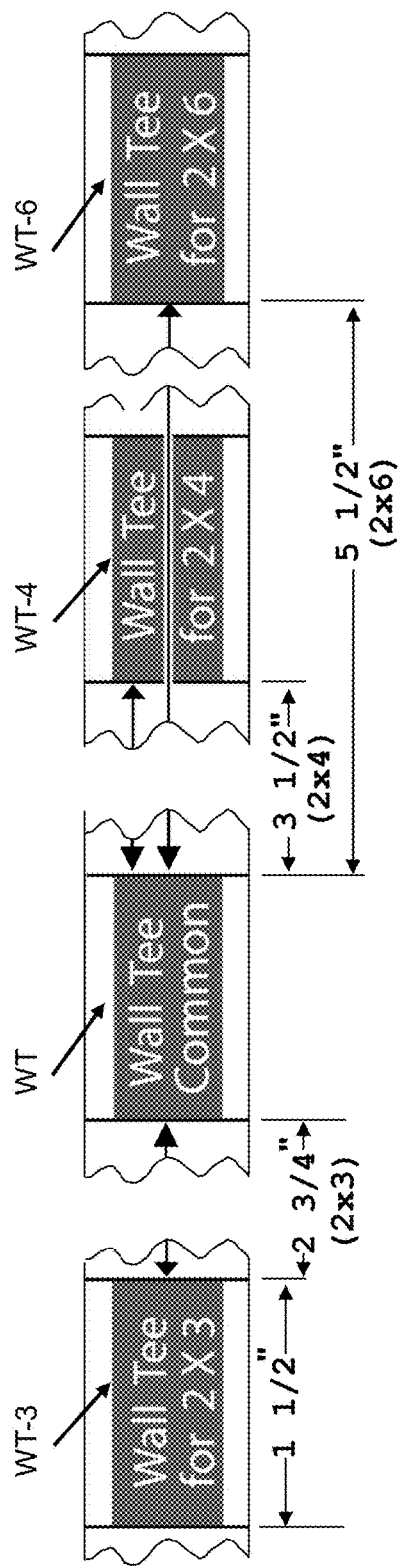
Fig. 4A  Layout for Wall Tees using Common icon.
( Bottom of 30' 2" tape measure blade )
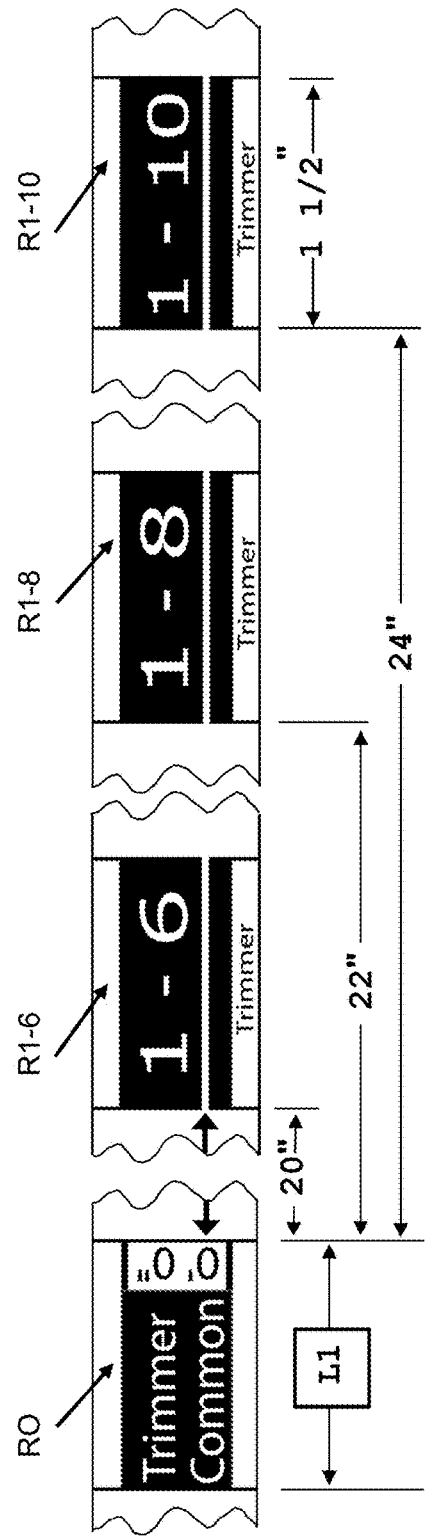
Fig. 4B  Layout for Residential Door Rough Opening Trimmers using Common Icon. ( Bottom of 30' 2" tape measure blade )

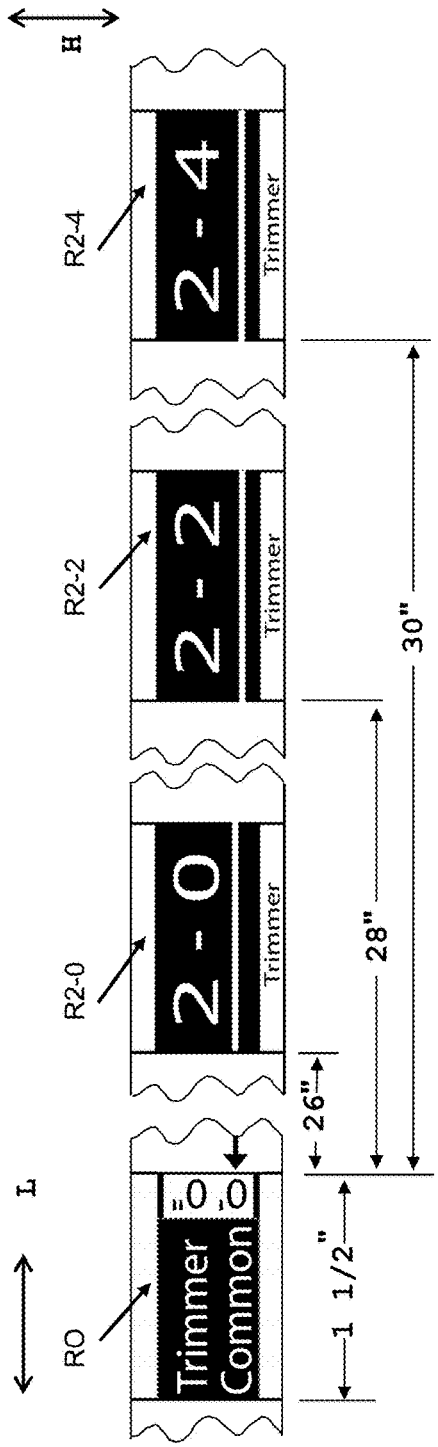
Fig. 4C  Layout for Residential Door Rough Opening Trimmers using Common Icon. ( Bottom of 30' 2" tape measure blade )
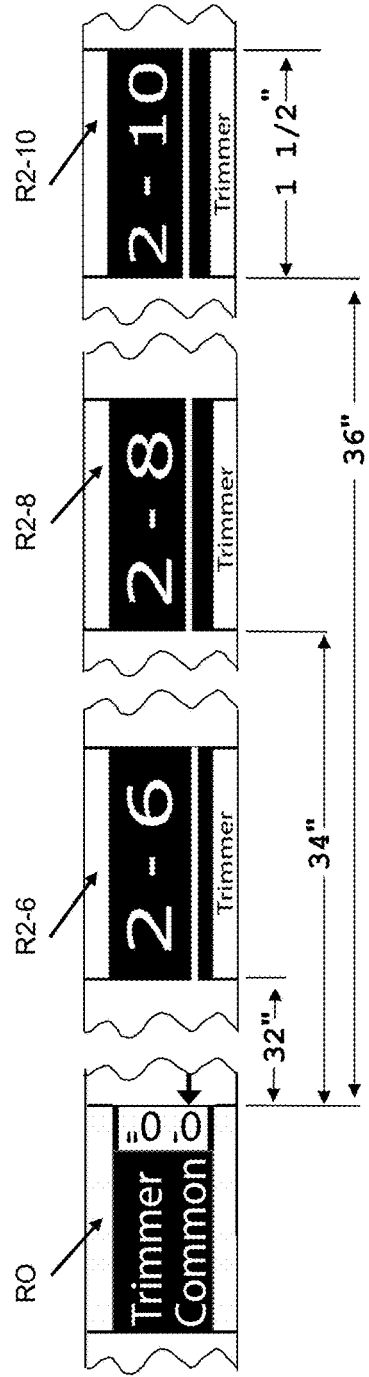
Fig. 4D  Layout for Residential Door Rough Opening Trimmers using Common Icon. ( Bottom of 30' 2" tape measure blade )

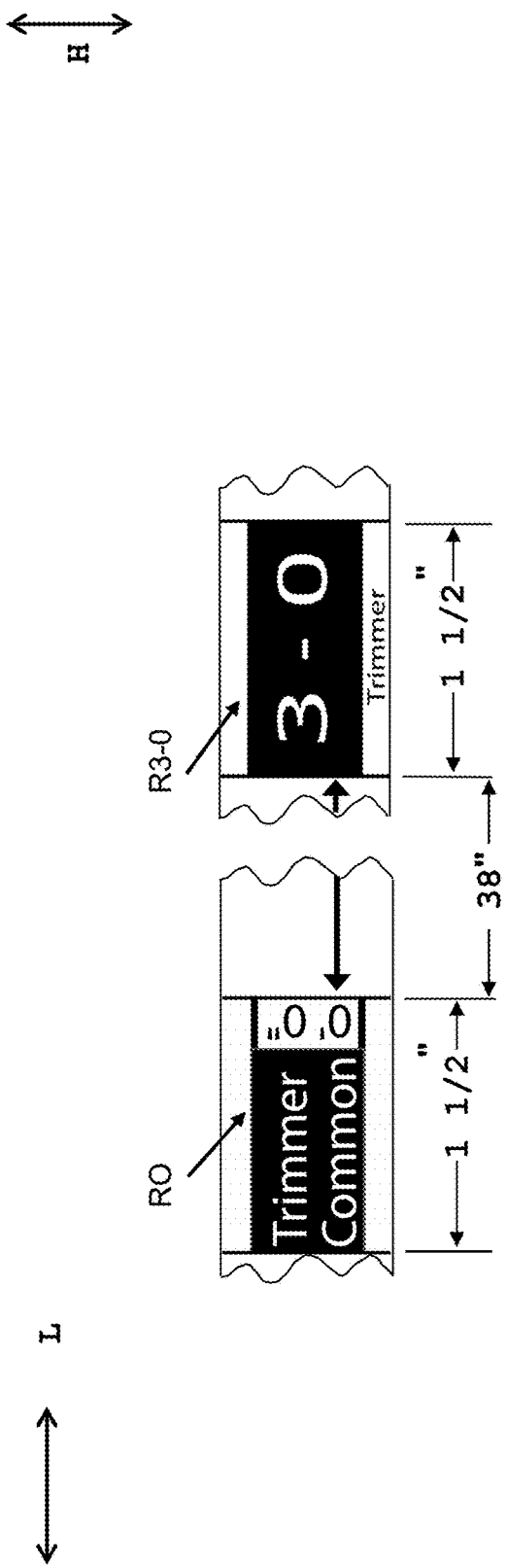
Fig. 4E   Layout for Residential Door Rough Opening Trimmers using Common Icon. ( Bottom of 30' 2" tape measure blade )

CARPENTER'S TAPE MEASURE HAVING FUNCTION INDICIA

BACKGROUND OF THE INVENTION

Field of the Invention

The present invention is directed to a carpenter's tape of sort used by professionals in residential and commercial construction. More particularly, it is directed to such a tape having indicia corresponding to one or more functions typically used in such construction.

U.S. Pat. No. 7,059,061, entitled "Framer's Layout and Cutting Guide" discloses a carpenter's tape measure which has indicia formed on the tape web, to assist a user, such as a professional carpenter or a do-it-yourself homeowner. In this reference, all symbols are found on the same side of the tape web.

SUMMARY OF THE INVENTION

The present invention is directed to a carpenter's tape comprising a tape web having a tape width, a tape length, a top side and a bottom side, and a housing into which the tape can be retracted.

In one aspect, length measurement indicia are provided on at least one of the top side and bottom side, and a squaring legend is provided on at least one of the housing and the tape web. The squaring legend comprises a plurality of sets of Pythagorean triples clustered together on at least one of the housing and the tape web. A plurality of sets of squaring function indicia are provided on at least one of the top side and the bottom side, each set of squaring function indicia comprising three symbols spaced apart from one another along the tape web by distances associated with differences between members of a corresponding one of said sets of Pythagorean triples.

In another aspect, length measurement indicia provided only on one of the top side and bottom side. Rough opening indicia are provided on the side opposite to the side on which the length measurement indicia appear, and the rough opening indicia are provided for at least the following widths: 1'6", 1'8", 1'10", 2'2" and 2'4".

BRIEF DESCRIPTION OF THE DRAWINGS

FIGS. 3A-3C show sections of the bottom side of the tape web in accordance with the first embodiment.

FIGS. 4A-4E show offsets, dimension and spacing between members of the wall tee layouts and the rough opening trimmers in FIGS. 3A-3E.

DETAILED DESCRIPTION

The contents of aforementioned U.S. Pat. No. 7,059,061 are incorporated by reference.

Figure 1:
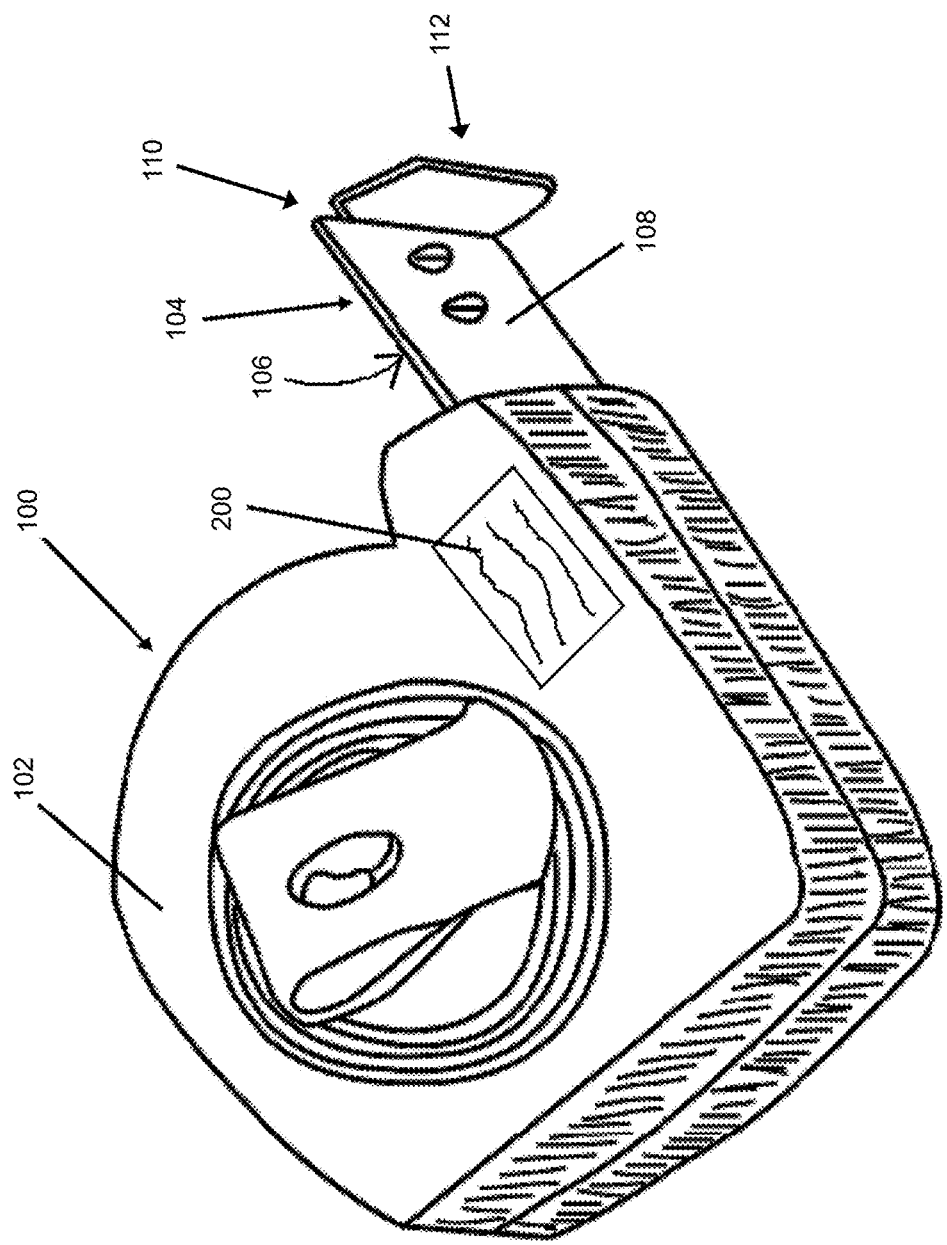
FIG. 1 shows a carpenter's tape in accordance with some embodiments of the present invention.

FIG. 1 shows a carpenter's tape 100 in accordance with some embodiments of the present invention. The tape 100 includes a housing 102 and a tape web 104. The tape web 104, which starts at a tape start 110 next to tape hook 112, has a top side 106 and a bottom side 108.

As is known to those skilled in the art, the tape web 104 can be formed of a relatively rigid such as metal or plastic, or a relatively pliable material, such as a fabric. When formed of metal, the tape web 104 may have a curved cross-section with, for instance, a concave top side 106 and convex bottom side 108. Generally speaking, the tape web 104 has a length between which is between 24' and 200' and has a width of between 0.25" and 2.25". It is understood that metric versions of the tape web 104 will have roughly equivalent dimensions. The length of the tape web may depend on the material, with the narrower and/or longer tape webs 104 more likely to be formed of a pliable material, and wider and/or shorter tape webs being formed of a relatively rigid material. Both types of material may be retracted into the housing 102.

In some embodiments, a squaring legend 200 (discussed further below) is provided on the housing 102. In other embodiments, the squaring legend 200 may be provided on the tape web 104, itself. In still other embodiments, the squaring legend 200 may be formed on both the housing 102 and the tape web 104.

First Embodiment

FIGS. 2A-2E depict a portion of the top side 206 of a first embodiment of a tape web 204. In this embodiment, the tape web 204 is preferably formed from metal or plastic.

The tape web 204 has a tape width W and a tape length L extending for the length of the tape web. Preferably length L is less than 50', and in a particularly preferred embodiment, has a length of 30'2". The tape web 204 includes length indicia 220, which may be in English measurements or in metric measurements. In the shown first embodiment, English measurements are used. Also in the shown first embodiment, the length indicia are present only on the top side 206 of the tape web 204, but in other embodiments may appear on both the top side 206 and the bottom side 208.

Squaring Legend and Squaring Function Indicia

Figure 2A:
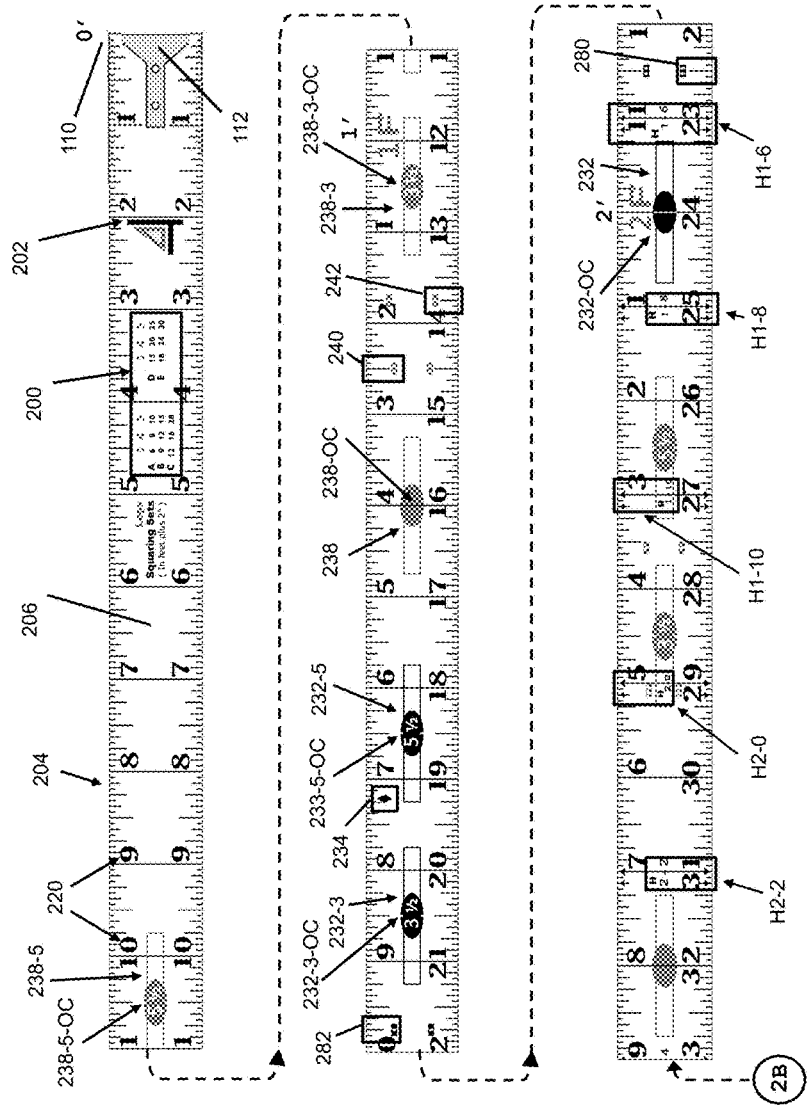
FIGS. 2A-2E show the top side of a tape web in accordance with a first embodiment.

As seen in FIG. 2A, within a predetermined distance (in the first embodiment, an offset of 2") from the tape start 110, is a squaring common icon 202 indicating the 2 inch hashmark(s) is the beginning of all squaring measurements. The squaring common icon 202 presents the shape (in this instance, a right-triangle) of subsequent squaring icons on the tape web 204. This provides the user with a visual clue of which shapes to look for along the length of the tape, associated with the squaring function.

A squaring legend 200 appears close to the squaring common icon 202. Generally speaking, the squaring legend 200 and the squaring common icon 202 appear within the first few inches, or even up to a foot or two, of the tape web 204, so that a user can easily view these upon initially extending the tape web 204 from the housing 102.

In the shown first embodiment, the squaring legend 200 appears on the same side of the tape web 204 as the length measurement indicia 220. In other embodiments, the squaring legend 200 may be provided on both the top side 206 and the bottom side 208. In still other embodiments, such as seen in the second embodiment discussed below, the squaring legend appears only on the bottom side.

The squaring legend 200 provides information to assist a user in the layout of right angles form walls, and other structures. More particularly, the squaring legend 200 includes one or more sets of Pythagorean triples clustered together. Each set of Pythagorean triples comprises three numbers which satisfy the Pythagorean equality of $a^2+b^2=c^2$, e.g., 3-4-5, 6, 8, 10, etc. These are used to create walls at right angles to one another. Given a first wall and a first location along the first wall from which a second wall is to extend at a right angle, the user marks off a distance "a" from the first location to identify a second location on the first wall. With the squaring common icon 202 at the first location, the user extends the tape at an approximate right angle to the first wall and draws a first arc of radius "b", the first arc having a length and sweep such that it likely crosses an imaginary a line perpendicular to the first wall. Finally, with the tape start at the second location, the user extends the tape in the direction of the first arc and draws a second arc of radius "c" which intersects the first arc. A line between the first location and the point of intersection of the first and second arcs is then at a right angle to the first wall.

The numbers within each set of Pythagorean triples therefore convey information about the location along the tape web 204 (in feet, in this embodiment) where squaring icons for a squaring function can be found. In this first embodiment, the squaring legend 200 is in the form of Table 1 below.

TABLE 1

Contents of Squaring Legend 200

|   | 3 | 4 | 5 |
|---|---|---|---|
| A | 6 | 8 | 10 |
| B | 9 | 12 | 15 |
| C | 12 | 16 | 20 |
| D | 15 | 20 | 25 |
| E | 18 | 24 | 30 |

Thus, the squaring legend 200 presents sets of Pythagorean triples which are multiples of 3-4-5. Specifically, the base set is 3'-4'-5', and additional sets, designated "A", "B", "C", "D", and "E", which correspond to successively higher multiples of the base set are provided. Although only a total of six sets of Pythagorean triples are shown in the table above, it is understood that for longer tape webs 104, seven or even more sets can be included.

Figure 2B:
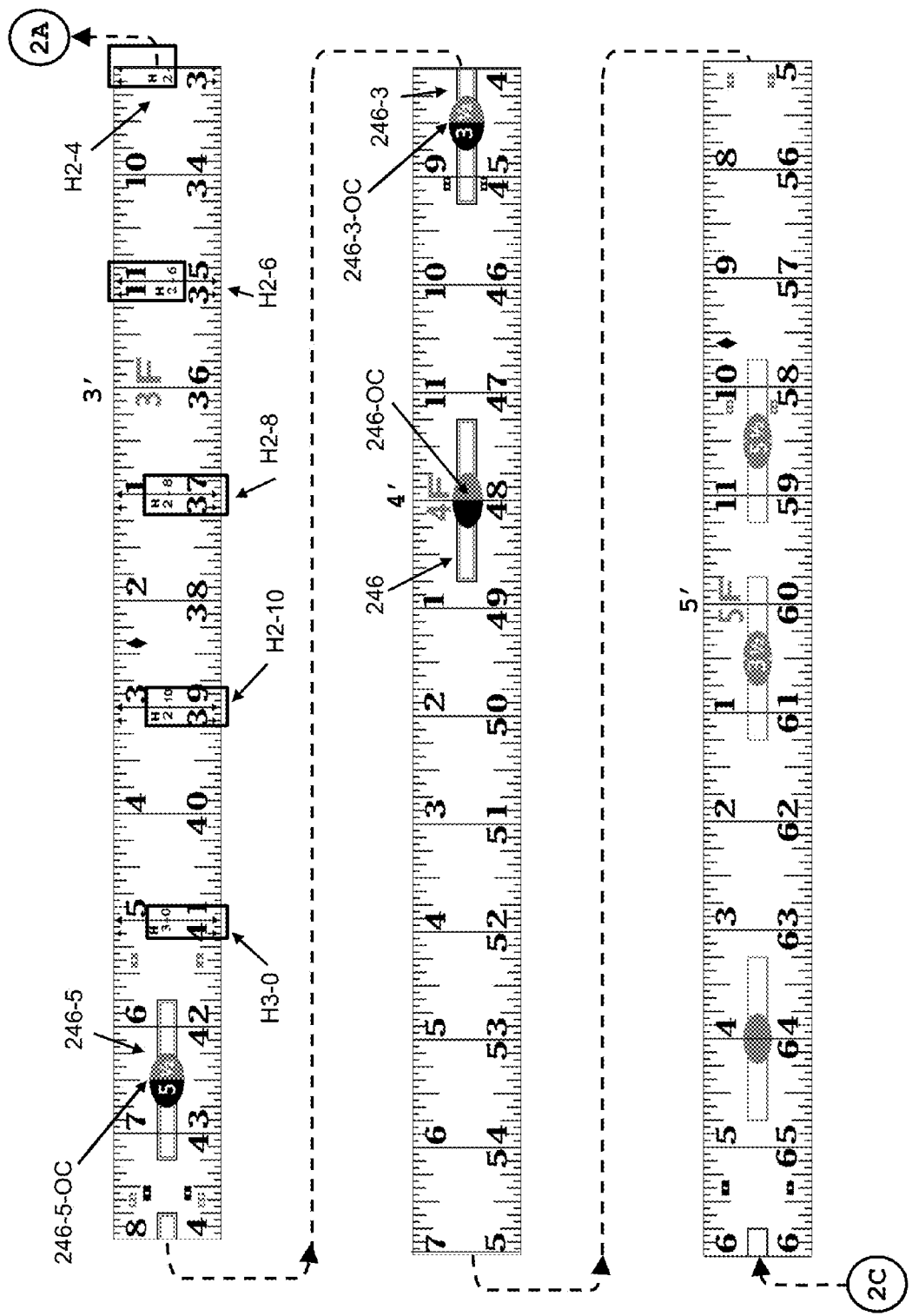
Figure 2C:
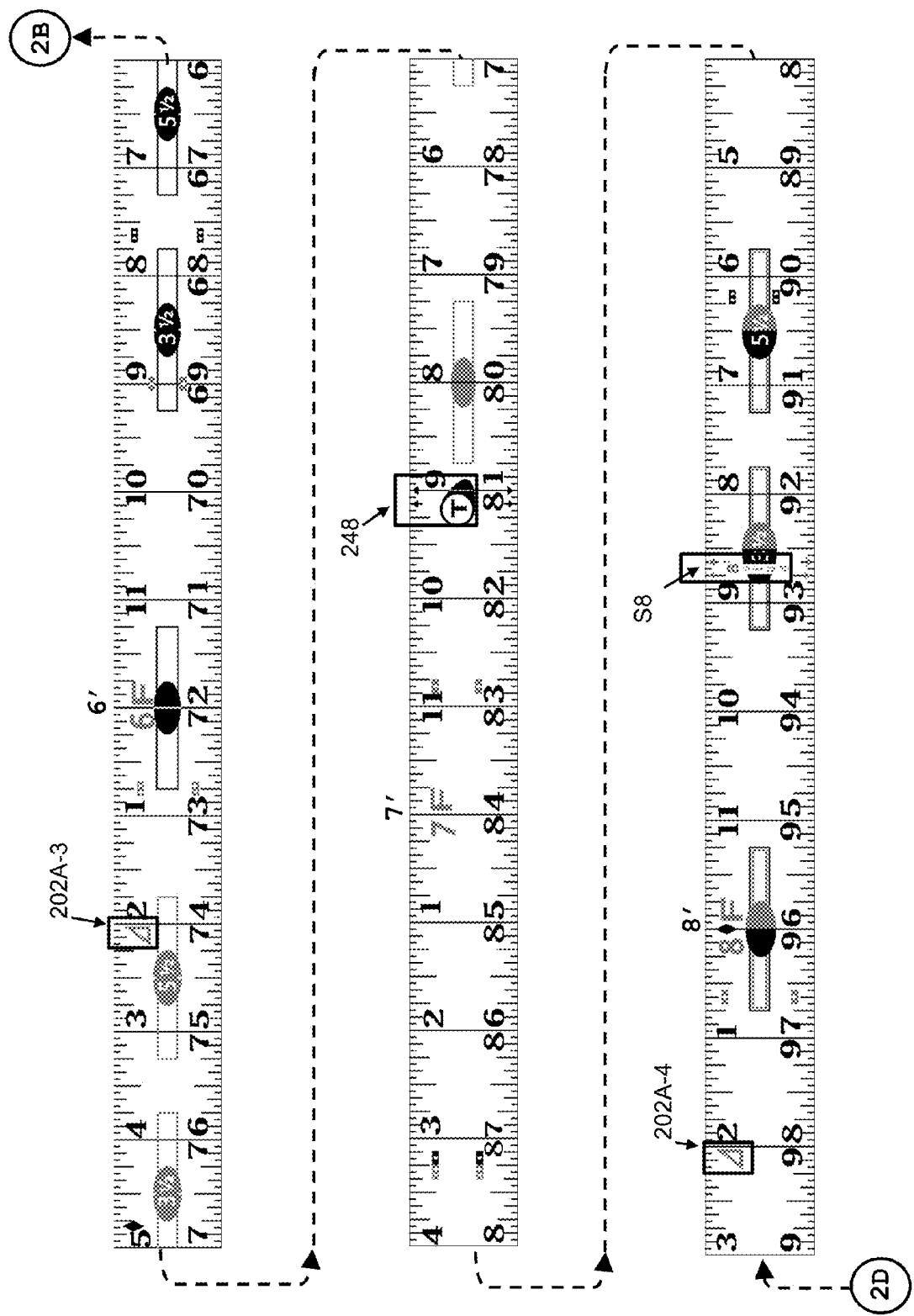
Figure 2D:
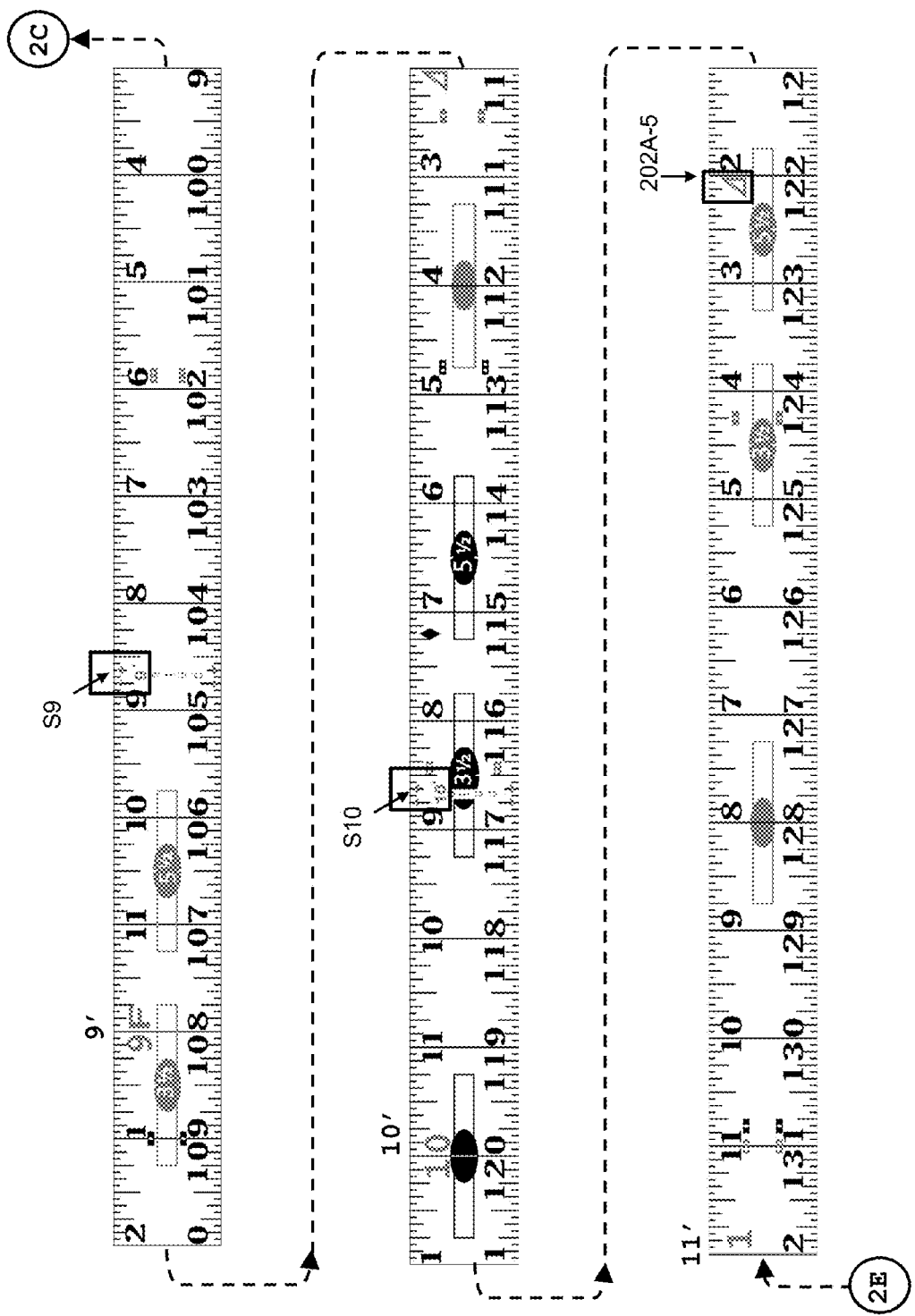

As seen in FIGS. 2C and 2D, squaring function indicia comprising three symbols 202A-3, 202A-4 and 202A-5, each symbol in the form of squaring icon, are provided at the 6'2", 8'2" and 10'2" length indicia on the top side 206. This helps a user readily identify the locations of the Pythagorean triplet 6-8-10 belonging to set "A" from the table above.

Figure 2E:
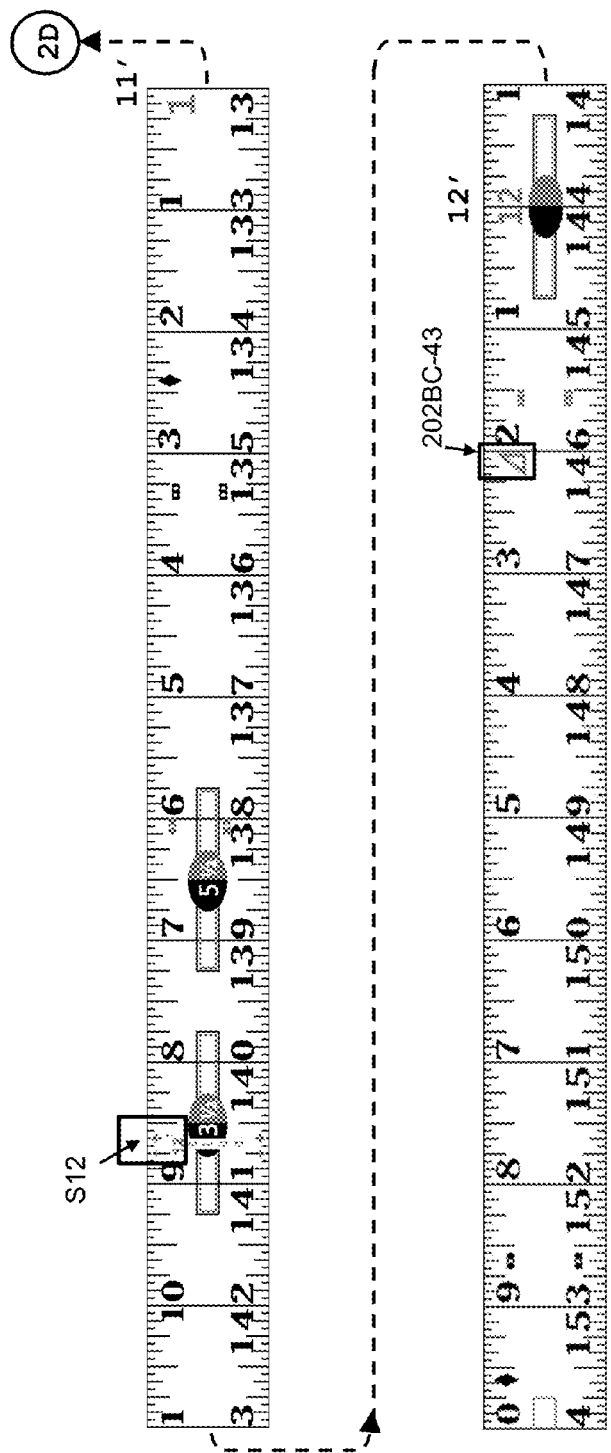

As seen in FIG. 2E, squaring function indicia belonging to different sets of Pythagorean triples are found at a common length marking on the tape. In particular, the squaring symbol 202BC-43 appearing at the 12'2" mark corresponds to both the second ("B") set, second (4) member and to the third ("C") set, first (3) member.

Figure 3A:
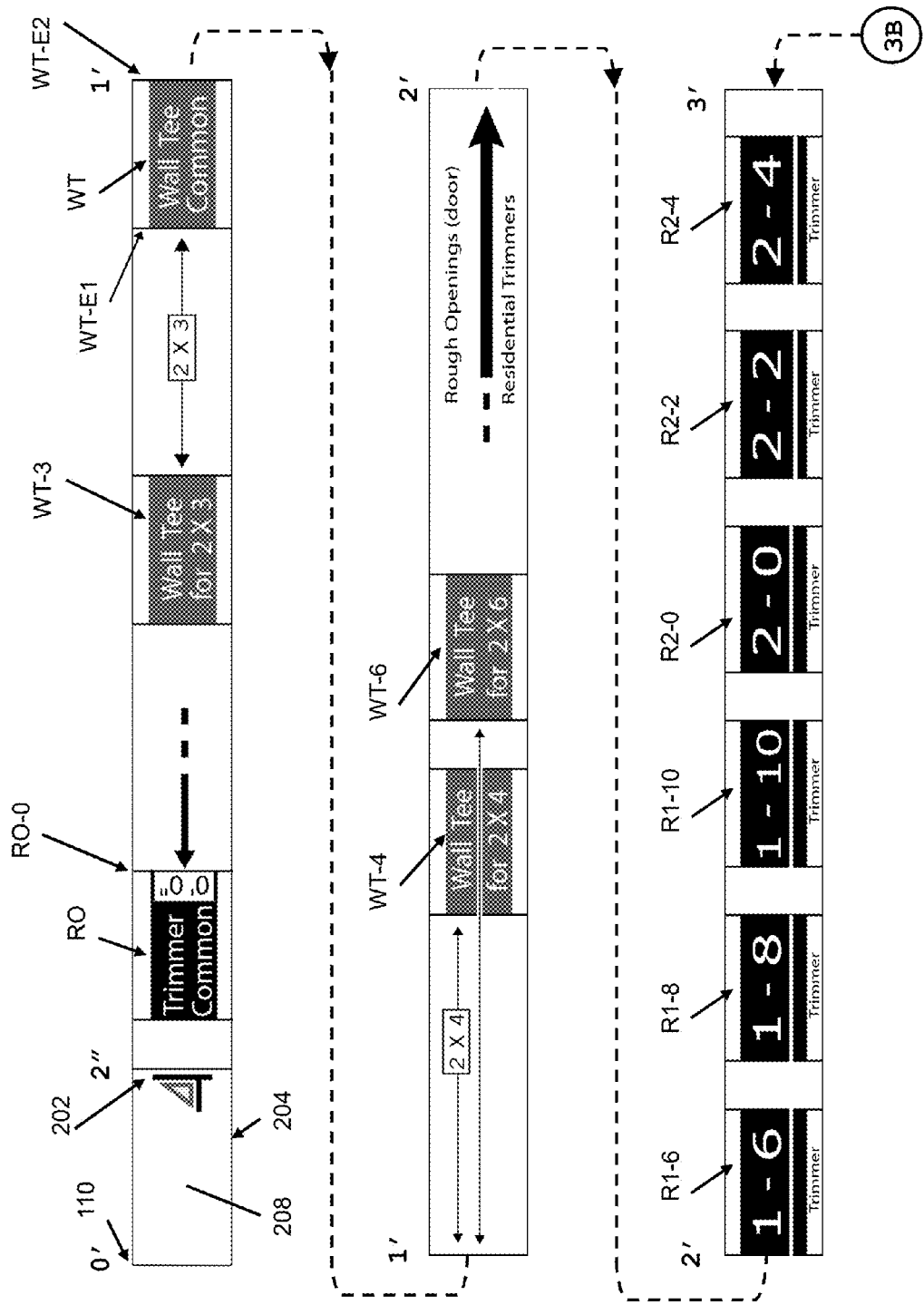
Figure 3B:
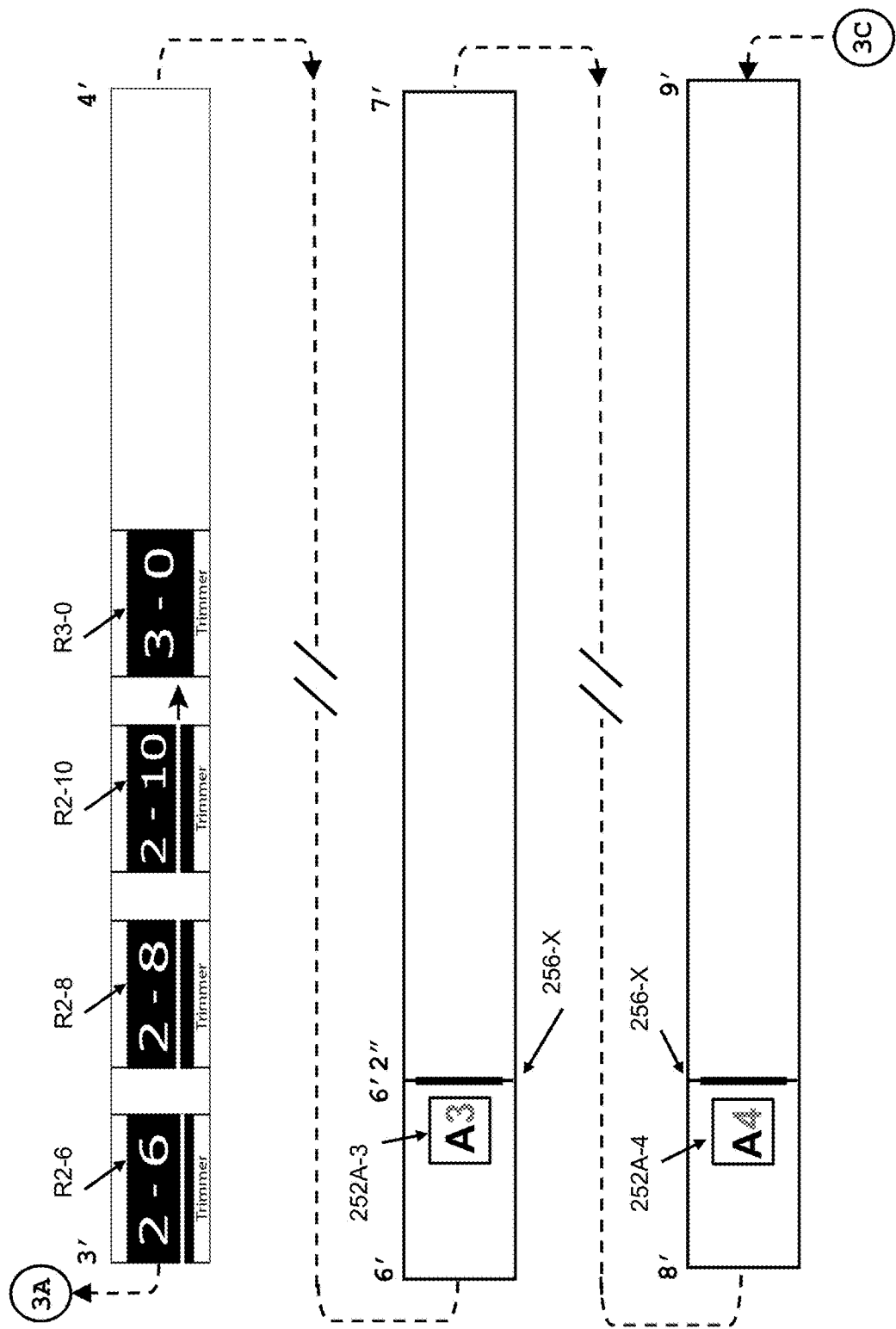

FIGS. 3A-3C show selected portions of the bottom side 208 of the tape web. As seen in FIG. 3A, a common squaring icon 202 is provided a predetermined offset distance from the tape start 110. As seen in FIGS. 3B and 3C, squaring function indicia in the form of three symbols 252A-3, 252A-4 and 252A-5, each symbol in the form of an alphanumeric designation, are provided at the 6'2", 8'2" and 10'2" length markings on the bottom side 208. In this instance, the three symbols constitute the alphanumeric designations "A3", "A4" and "A5" and designate the locations of the Pythagorean triplet 6-8-10 belonging to set "A" from the table above. Adjacent each of the symbols is a vertical hash mark 256-X indicating the exact distance location of the corresponding member of the Pythagorean triple (with offset). As seen in FIG. 3C at the 12'2" length indicia, squaring function indicia may have two or more symbols representing members of different sets. In this instance, symbols 252B-4 and 252C-3 both occur at the 12'2" length marking, with 252B-4 corresponding to the second ("B") set's second (4) member, and 252C-3 corresponding to the third ("C") set's first (3) member.

On-Center, Offset Stud Indicia

As seen in FIGS. 2A-2E, a plurality of on-center 5½" and 3½" stud offsets are provided on the top side 206 of the tape web 204. Reference character 238 is an oval of a first pattern or color within a 1½" wide rectangle indicating 16" stud; black vertical line 238-OC in middle of oval signifying 'on-center' of the stud. Reference character 238-3 is an oval containing '3½' and is of a first pattern or color within a 1½" wide rectangle indicating a 16" stud offset by 3½"; white vertical lines 238-3-OC at top and bottom of oval signifying 'on-center' of the stud. Reference character 238-5 is an oval containing '5½' and is of a first pattern or color within a 1½" wide rectangle indicating a 16" stud offset by 5½"; white vertical lines 238-5-OC at top and bottom of oval signifying 'on-center' of the stud.

Reference character 232 is an oval of a second pattern or color within a 1½" wide rectangle indicating a 24" stud; white vertical line 232-OC in middle of oval signifying 'on-center' of the stud. Reference character 232-3 is an oval containing '3½' and is of a second pattern or color within a 1½" wide rectangle indicating a 24" stud offset by 3½"; white vertical lines 232-3-OC at top and bottom of oval signifying 'on-center' of the stud. Reference character 232-5 is an oval containing '5½' and is of a second pattern or color within a 1½" wide rectangle indicating a 24" stud offset by 5½"; white vertical lines 232-5-OC at top and bottom of oval signifying 'on-center' of the stud.

Reference character 246 is an oval with half being of a first pattern or color and the other half being of a second pattern or color within a 1½" wide rectangle indicating a hybrid 16" and 24" stud; vertical line 246-OC in middle of oval signifying 'on-center' of the stud. Reference character 246-3 is an oval with half being of a first pattern or color and the other half being of a second pattern or color containing '3½' and is within a 1½" wide rectangle indicating a hybrid 16" and 24" stud offset by 3½"; vertical line 246-3-OC in middle of oval signifying 'on-center' of the stud. Reference character 246-5 is an oval with half being of a first pattern or color and the other half being of a second pattern or color containing '5½' and is within a 1½" wide rectangle indicating a hybrid 16" and 24" stud offset by 5½"; vertical line 246-5-OC in middle of oval signifying 'on-center' of the stud.

Header Cut Indicia

As seen in FIGS. 2A-2B, a plurality of header cut indicia are provided on the top side 206 of the tape web 204. The header cut indicia are marked with reference characters H1-6, H1-8, H1-10, H2-0, H2-2, H2-4, H-2-6, H2-8, H2-10 and H3-0, and provide guidance for a user to make header cuts at relative distances for pre-hung door sizes 1'6", 1'8", 1'10", 2'0", 2'2", 2'4", 2'6", 2'8", 2'10" and 3'0", respectively. For each header cut, two measuring indicia are provided, the indicia closest to the Tape Start 110 represents the actual length. The second indicia is provided for measuring and cutting convenience.

Wall Stud Indicia

As seen in FIGS. 2C-2E, the top side 206 of the tape web 204 is further provided with wall stud indicia S8, S9, S10 and S12, at locations suitable for marking pre-cut studs of nominal length 8', 9', 10' and 12', respectively. The wall stud indicia include markings (in the shown figures, the markings are arrows) spaced apart by ⅛" to indicate a thickness of a standard saw blade, which corresponds to the loss of wood when the cut is made. The wall stud indicia closest to the Tape Start 110 represents the actual length. The second indicia—spaced ⅛" further from the Tape Start 110—is provided for measuring and cutting convenience.

Rough Opening Trimmers

As seen in FIGS. 3A-3B, a plurality of rough opening trimmer indicia also are provided on the bottom side 208 of the tape web 204. As seen in FIG. 3A, a rough opening trimmer common indicia R0 is located close to the tape start 110 and past the common squaring icon 202. The far edge of the rough opening trimmer common indicia R0 establishes a zero origin RO-0 for the rough openings. As seen in FIGS. 3A-3B, the rough opening trimmer indicia are marked with reference characters R1-6, R1-8, R1-10, R2-0, R2-2, R2-4, R-2-6, R2-8, R2-10, and R3-0, and provide guidance for a user to make, e.g., residential rough openings for pre-hung door width sizes 1'6", 1'8", 1'10", 2'0", 2'2", 2'4", 2'6", 2'8", 2'10" and 3'0", respectively.

FIGS. 4B-4E show the lengths, and spacings, among the rough opening trimmer indicia. As seen in these figures, each of these indicia has a length L1, which preferably is 1.5". Smallest rough opening trimmer indicia R1-6 commences 20" from the nearest end of the rough opening trimmer common indicia R0, and subsequent indicia are spaced at 2" intervals.

Wall Tee Layouts

As seen in FIG. 3A, a plurality of wall tee layout indicia WT-3, WT, WT-4, WT-6 are provided on the bottom side 208 of the tape web 204. All of the wall tee layout indicia are located in the 20" between the rough opening trimmer common indicia R0 and the smallest rough opening trimmer indicia R1-6. The wall tee common indicia W0 has one wall tee indicia WT-3 on a first side and two wall tee indicia WT-4, WT-6 on the other side. As seen in FIG. 4A, wall tee indicia WT-3 for 2"×3" wall tees is located 2¾" from a first edge WT-E1 of the wall tee common indicia WT; wall tee indicia WT-4 for 2"×4" wall tees is located 3½" from a second edge WT-E2 of wall tee common indicia WT; and wall tee indicia WT-6 for 2"×6" wall tees is located 5½" from the second edge WT-E2 of wall tee common indicia WT, past wall tee indicia WT-4. It is understood that these actual spacings from the wall tee common indicia WT correspond to the nominal lumber sizes of 2"×3", 2"×4", and 2"×6".

It can be seen from the foregoing, that the squaring function indicia, the wall tee indicia, and the rough opening trimmer indicia are provided on the bottom side 208 of the tape web 204. Thus, in those embodiments where the length measurement indicia are provided only on the top side 206, at least the wall tee indicia and the rough opening trimmer indicia are provided on the side opposite the side on which the length measurement indicia are provided.

Additional Indicia

It is noted that additional indicia may be provided on the top side 206 of the tape web 204. As seen in FIGS. 2A-2E, additional indicia such as those indicated by reference characters 232, 234, 236, 238, 240, 242, 246, 248, 280, and 282. Reference character 234 is a diamond-shaped symbol signifying a 19.2" spacing for wood I-beams. Reference character 248 is a 'T' within a circle and with shading on the right side. This symbol signifies an 81" Trimmer cut. Two measuring indicia are provided. The indicia closest to the Tape Start 110 is for actual length. The second indicia represents a nominal length and is provided for measuring and cutting convenience.

Reference character 240 is two ovals within a ⅛"wide rectangle of a first pattern or color and signifies a 14⁷⁄₁₆" standard block cut for walls with studs spaced 16" apart. Reference character 242 is a single oval within a ⅛" wide rectangle of a first pattern or color and signifies a 13¹¹⁄₁₆" starter block cut for walls with studs spaced 16" apart. Reference character 280 is two ovals within a ⅛"wide rectangle of a second pattern or color and signifies a 22⁷⁄₁₆" standard block cut for walls with studs spaced 24" apart. Reference character 282 is a single oval within a ⅛" wide rectangle of a second pattern or color and signifies a 21¹¹⁄₁₆" starter block cut for walls with studs spaced 24" apart. The vertical side, closest to the Tape Start 110, of each of the first instances of the 4 block cut types represents the actual size of the block cut.

Second Embodiment

Figure 5A:
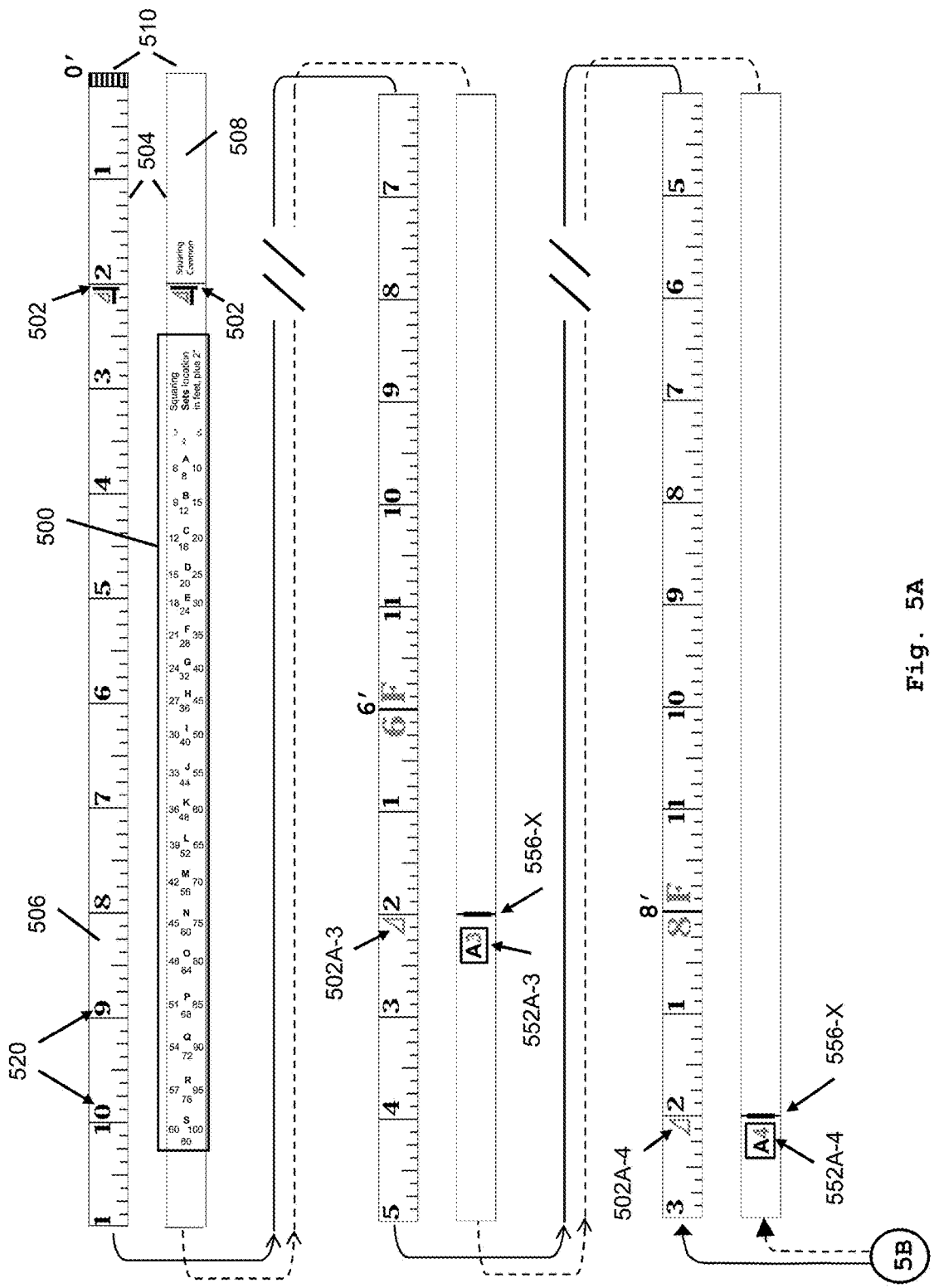
FIGS. 5A-5C show sections of the top and bottom sides of a tape web in accordance with a second embodiment.
Figure 5B:
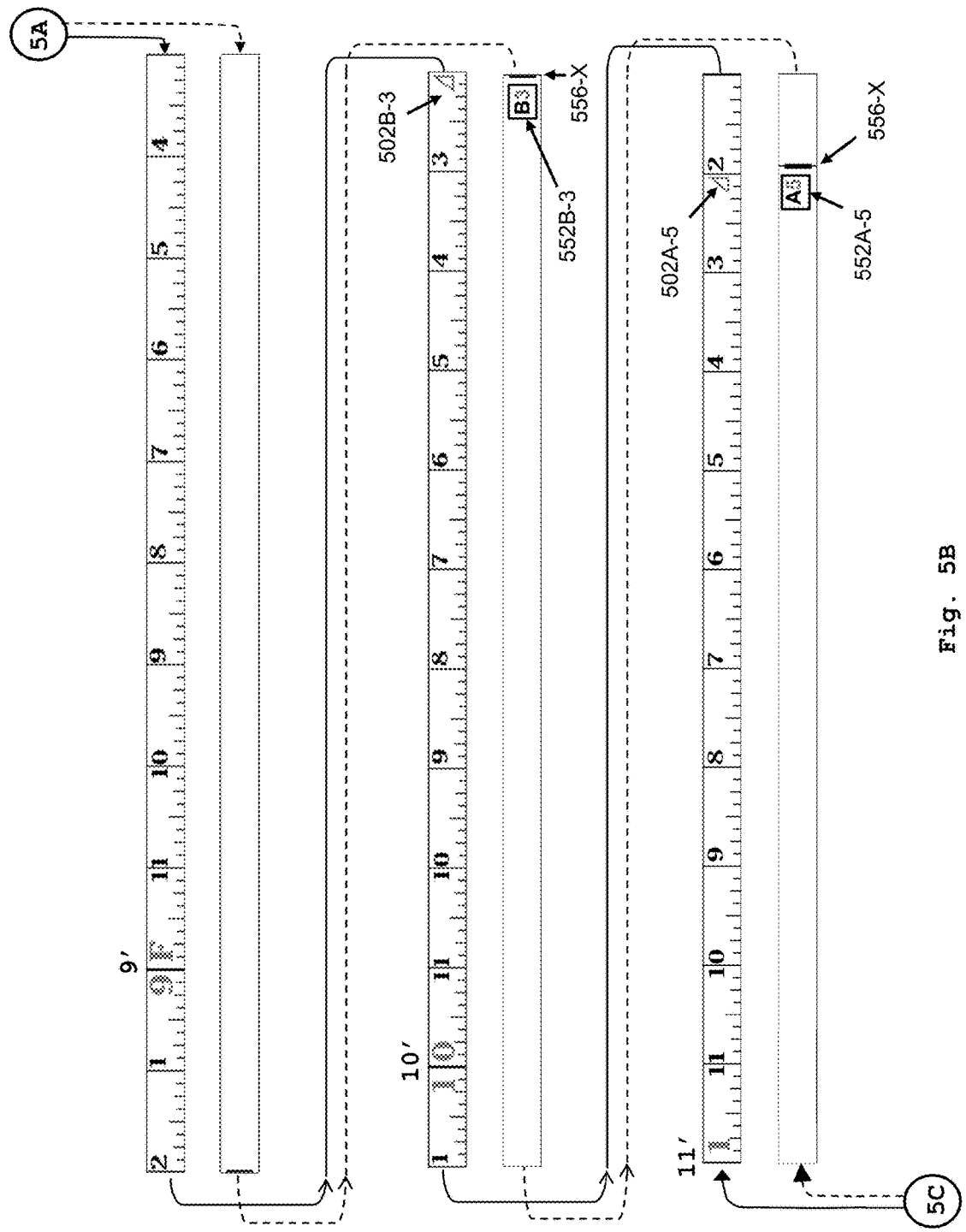
Figure 5C:
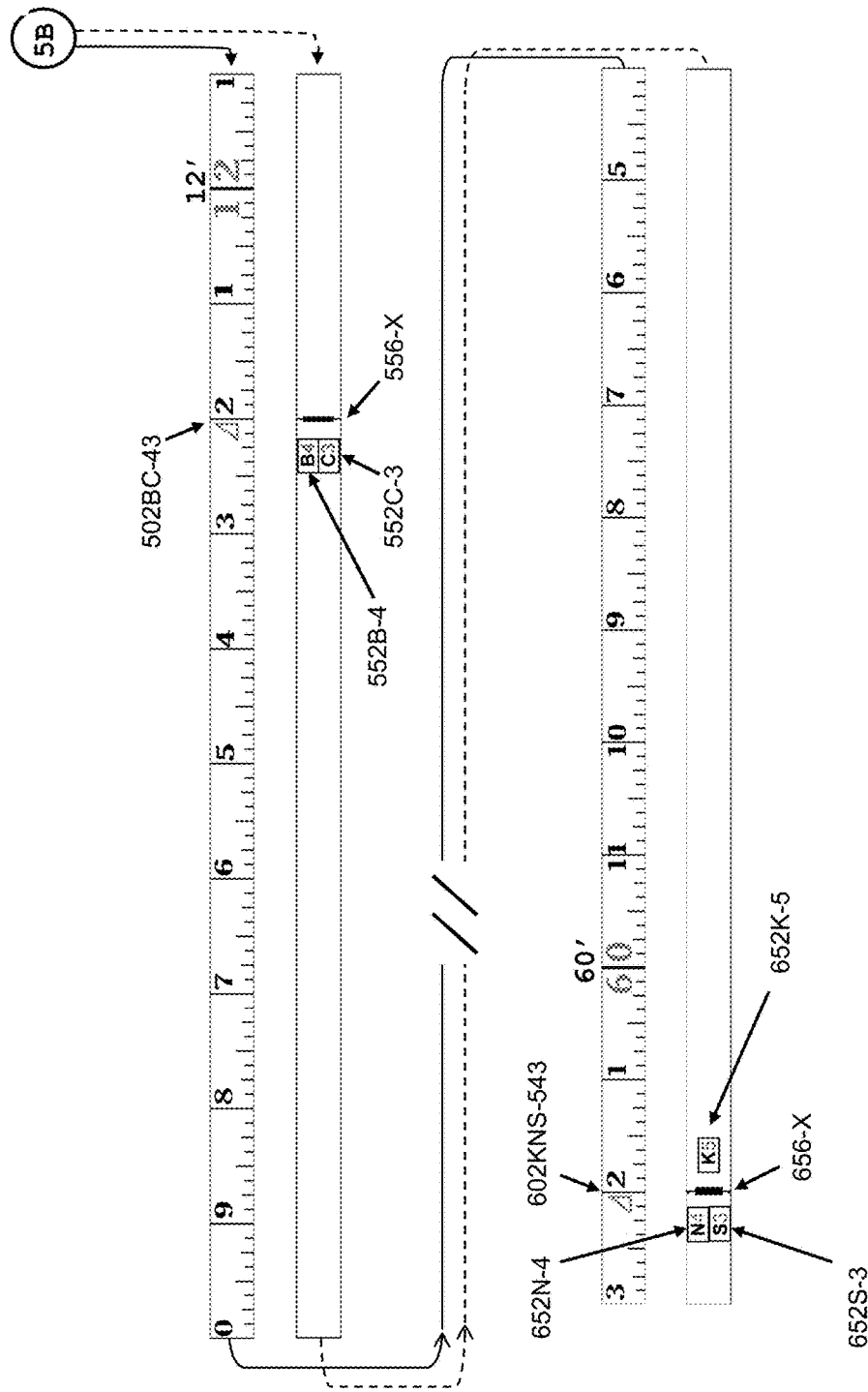

FIGS. 5A-5C show selected portions of a tape web 504 in accordance with a second embodiment of the present invention. This second embodiment comprises a narrow-width tape web 504 having a tape start 510, a top side 506, a bottom side 508, with length indicia 520 appearing on the top side 506. The narrow-width tape web 504 of the second embodiment is considerably longer than the tape web 104 of the first embodiment. Thus, the tape web 504 can be 50', or longer. In some versions, tape web can be as large as 200'.

In this second embodiment, a squaring legend 500 appears only on the bottom side 508, although common squaring icon 502 appears on both the top side 506 and the bottom side 508. Placing the squaring legend only on the bottom side 508 of the narrow-width tape web 504 avoids cluttering the top side 506, and facilitates use of the tape. It is understood that the top side 506 may have other indicia. In this second embodiment, the squaring legend 500 is in the form of Table 2 below.

TABLE 2

Contents of Squaring Legend 500

| Set | 3 | 4 | 5 |
| --- | --- | --- | --- |
| A | 6 | 8 | 10 |
| B | 9 | 12 | 15 |
| C | 12 | 16 | 20 |
| D | 15 | 20 | 25 |
| E | 18 | 24 | 30 |
| F | 21 | 28 | 35 |
| G | 24 | 32 | 40 |
| H | 27 | 36 | 45 |
| I | 30 | 40 | 50 |
| J | 33 | 44 | 55 |
| K | 36 | 48 | 60 |
| L | 39 | 52 | 65 |
| M | 42 | 56 | 70 |
| N | 45 | 60 | 75 |
| O | 48 | 64 | 80 |
| P | 51 | 68 | 85 |
| Q | 54 | 72 | 90 |
| R | 57 | 76 | 95 |
| S | 60 | 80 | 100 |

Additionally, the squaring legend 500 on tape web 504 has more sets of Pythagorean triplets than the corresponding squaring legend 200 of tape web 204 of the first embodiment. As seen in FIG. 5A, a total of twenty sets, including 3'-4'-5' are provided, with the largest set of Pythagorean triples being 60'-80'-100', thus facilitating the layout of walls perpendicular to each other, at least one of the walls being on the order of 100' in length.

As seen in FIGS. 5A-5B, squaring function indicia in the form of three symbols 502A-3, 502A-4 and 502A-5 are provided at the 6'2", 8'2" and 10'2" length indicia on the top side 506. Corresponding alphanumeric designations "A3", "A4" or "A5" are provided at the same 6'2", 8'2" and 10'2" length marks on the bottom side 508. This helps a user readily locate members of the Pythagorean triple 6-8-10 belonging to set "A" from squaring legend 500 by looking at either one of the top or bottom sides. In addition, as seen in FIG. 5B, a similar symbol 502B-3 constituting a squaring icon is provided at the 9'2" length indicia on the top side 506 while alphanumeric designation "B3" is provided at the 9'2" length indicia on the bottom side 508. This helps a user locate the first member of the Pythagorean triple 9-12-15 from set B of the legend 500, as presented in Table 2 above. It is understood that tape web 504 has additional such symbols corresponding to the members of the various Pythagorean triples on the legend 500, provided on the top side 504 and corresponding alphanumeric designations on the bottom side 508.

As also seen in FIGS. 5A-5B, squaring function indicia in form of three symbols 552A-3, 552A-4 and 552A-5 are provided at the 6'2", 8'2" and 10'2" length markings on the bottom side 108. In this instance the three symbols constitute the alphanumeric designations "A3", "A4" and "A5" and designate the locations of the Pythagorean triplet 6-8-10 belonging to set "A" from Table 2 above. As seen in FIG. 5B, a similar symbol 552B-3, comprising the alphanumeric designation "B3", is provided at the 12'2" length indicia on the bottom side. Adjacent each of the aforementioned symbols on the bottom side 508 is a vertical hash mark 556-X indicating the exact distance location of the corresponding member of the Pythagorean triple (with offset).

FIG. 5C shows that squaring function indicia belonging to different sets of Pythagorean triples can be found at a common length marking, in this second embodiment. In FIG. 5C, squaring function icons are shown to be present at both the 12'2" length marking and the 60'2" length mark. On the front side of the tape, squaring function icon 502BC-43 corresponds to both the second ("B") set's second (4) member, and the third ("C") set's first (3) member. On the back side of the tape, icons 552B-4 and 552C-3, respectively, indicate similar information, while vertical line 556-X designates the 12'2" length marking. Also present on the front side of the tape, squaring function icon 602KNS-543 corresponds to all three of: (a) to the 11$^{th}$ ("K") set's third (5) member, (b) the 14$^{th}$ ("N") set's second (4') member, and (c) the 19$^{th}$ (S') set's first (3) member. On the back side of the tape, icons 652K-5, 652N-4 and 652S-3, respectively, indicate similar information, while vertical line 656-X indicates the 60'2" length marking.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A carpenter's tape comprising:
   a tape web having a tape width, a tape length, a top side and a bottom side;
   a housing into which the tape can be retracted;
   length measurement indicia on at least one of the top side and bottom side;
   a squaring legend comprising a plurality of sets of Pythagorean triples clustered together on at least one of the housing and the tape web, members of each Pythagorean triple being suitable for creating walls at right angles to each other.

2. The carpenter's tape according to claim 1, comprising a plurality of sets of squaring function indicia on at least one of the top side and the bottom side, each set of squaring function indicia comprising three symbols spaced apart from one another along the tape web by distances associated with differences between members of a corresponding one of said sets of Pythagorean triples.

3. The carpenter's tape according to claim 2, wherein:
   the plurality of sets of squaring function indicia are formed on both the top side and the bottom side.

4. The carpenter's tape according to claim 1, wherein the squaring legend comprises at least three sets of proportional Pythagorean triples.

5. The carpenter's tape according to claim 1, wherein:
   squaring function indicia belonging to different sets of Pythagorean triples are found at a common length marking on the tape.

6. The carpenter's tape according to claim 1, wherein:
   the tape web has a concave top side and a convex bottom side;
   the squaring legend is on the same side as the length measurement indicia.

7. The carpenter's tape according to claim 1, wherein:
   the tape web has a concave top side and a convex bottom side;
   the length measurement indicia are formed on the concave top side and the squaring legend is on the convex bottom side.

8. The carpenter's tape according to claim 1, wherein:
   the squaring legend is formed within the first 5' of the tape web.

9. The carpenter's tape according to claim 1, wherein:
   squaring legends are formed on both the top side and the bottom side.

10. The carpenter's tape according to claim 1, wherein:
    squaring legends are formed on both the top side and the bottom side; and
    the plurality of sets of squaring function indicia are formed on both the top side and the bottom side.

11. The carpenter's tape according to claim 1, wherein:
    the tape length is between 24' and 200'; and
    the tape width is between 0.25" and 2.25".

12. The carpenter's tape according to claim 1, wherein:
    the length measurement indicia are formed only on one of the top side and bottom side; and
    the side on which the length measurement indicia are not formed is provided with rough opening indicia corresponding to at least the following door sizes: 1'6", 1'8", 1'10", 2'2" and 2'4".

13. The carpenter's tape according to claim 12, wherein:
    the rough opening indicia correspond to the following door sizes: 1'6", 1'8", 1'10", 2'0", 2'2" and 2'4", 2'6", 2'8", 2'10" and 3'0".

14. The carpenter's tape according to claim 12, wherein:
    the side on which the length measurement indicia are not formed is provided with wall tee layouts corresponding to 2"×3", 2"×4" and 2"×6".

15. The carpenter's tape according to claim 1, wherein:
    each entry in the squaring legend is a multiple of 3, 4 or 5.

16. The carpenter's tape according to claim 1, wherein the squaring legend comprises a plurality of rows and columns; and
    all row or all columns contain at least one set of Pythagorean triples.

17. A carpenter's tape comprising:
    a tape web having a tape width, a tape length, a top side and a bottom side;
    a housing into which the tape can be retracted;

length measurement indicia provided only on one of the top side and bottom side; and rough opening indicia provided only on the side opposite to the side on which the length measurement indicia appear, wherein the rough opening indicia are provided for at least the following door sizes: 1'6", 1'8", 1'10", 2'2" and 2'4".

18. The carpenter's tape according to claim 17, wherein: the side on which the length measurement indicia are formed is provided with header indicia corresponding to at least the following door sizes: 1'6", 1'8", 1'10 ", 2'2" and 2'4".

19. The carpenter's tape according to claim 18, wherein: the rough opening indicia are provided for at least the following door sizes: 1'6", 1'8", 1'10", 2'0", 2'2" and 2'4", 2'6", 2'8", 2'10" and 3'0"; and the header indicia are provided for at least the following door sizes: 1'6", 1'8", 1'10", 2'0", 2'2" and 2'4", 2'6", 2'8", 2'10" and 3'0".

20. The carpenter's tape according to claim 17, wherein: the side on which the length measurement indicia are not formed is provided with wall tee layouts corresponding to the following cross-sections: 2"×3", 2"×4" and 2"×6".

21. The carpenter's tape according to claim 17, wherein: the side on which the length measurement indicia are formed is provided with pre-cut wall stud indicia corresponding to the following lengths: 8', 9', 10' and 12'.

22. The carpenter's tape according to claim 21, wherein the rough opening indicia are provided for at least the following door sizes: 1'6", 1'8", 1'10", 2'0", 2'2" and 2'4", 2'6", 2'8", 2'10" and 3'0"; and the side on which the length measurement indicia are formed is provided with header indicia corresponding to at least the following door sizes: 1'6", 1'8", 1'10 ", 2'0", 2'2" and 2'4", 2'6", 2'8", 2'10" and 3'0";

the side on which the length measurement indicia are not formed is provided with wall tee layouts corresponding to the following cross-sections: 2"×3", 2"×4" and 2"×6"; and the side on which the length measurement indicia are formed is provided with pre-cut wall stud indicia corresponding to the following lengths: 8', 9', 10' and 12'.

23. The carpenter's tape according to claim 17, wherein: the side on which the length measurement indicia are formed is provided with 3½" and 5½" on-center offset stud indicia corresponding to 16" on-center stud indicia, 24" on-center stud indicia, and hybrid 16" and 24" 'on-center' stud indicia.

24. The carpenter's tape according to claim 17, further comprising:

a squaring legend comprising a plurality of sets of Pythagorean triples clustered together on at least one of the housing and the tape web; and a plurality of sets of squaring function indicia on the same side as the length measurement indicia, each set of squaring function indicia comprising three symbols spaced apart from one another along the tape web by distances associated with differences between members of a corresponding one of said sets of Pythagorean triples.

25. The carpenter's tape according to claim 17, wherein: squaring function indicia belonging to different sets of Pythagorean triples are found at a common length marking on the tape.

26. The carpenter's tape according to claim 24, wherein: each entry in the squaring legend is a multiple of 3, 4 or 5.

27. The carpenter's tape according to claim 24, wherein: the squaring legend comprises a plurality of rows and columns; and all row or all columns contain at least one set of Pythagorean triples.

* * * * *